United States Patent
Potes

(10) Patent No.: US 10,728,236 B1
(45) Date of Patent: Jul. 28, 2020

(54) AUGMENTED REALITY DATA EXCHANGE

(71) Applicant: Amazon Technologies, Inc., Seattle, WA (US)

(72) Inventor: David Potes, Oakland, CA (US)

(73) Assignee: Amazon Technologies, Inc., Seattle, WA (US)

( * ) Notice: Subject to any disclaimer, the term of this patent is extended or adjusted under 35 U.S.C. 154(b) by 685 days.

(21) Appl. No.: 15/258,965

(22) Filed: Sep. 7, 2016

(51) Int. Cl.
*H04L 29/08* (2006.01)
*H04L 29/06* (2006.01)
*G06T 19/00* (2011.01)

(52) U.S. Cl.
CPC ........ *H04L 63/0823* (2013.01); *G06T 19/006* (2013.01); *H04L 63/123* (2013.01)

(58) Field of Classification Search
CPC .. H04L 63/0823; H04L 63/123; G06T 19/006
See application file for complete search history.

(56) References Cited

U.S. PATENT DOCUMENTS

| 9,092,600 | B2* | 7/2015 | Scavezze | G06F 21/31 |
| 2005/0139685 | A1* | 6/2005 | Kozlay | G06K 19/07354 |
| | | | | 235/492 |
| 2015/0127965 | A1* | 5/2015 | Hong | H04L 9/3231 |
| | | | | 713/323 |
| 2015/0187138 | A1* | 7/2015 | Mullins | G06T 19/006 |
| | | | | 345/633 |
| 2016/0049005 | A1* | 2/2016 | Mullins | G06T 19/006 |
| | | | | 345/420 |
| 2016/0056964 | A1* | 2/2016 | Andiappan | H04L 9/3263 |
| | | | | 713/189 |
| 2016/0063442 | A1* | 3/2016 | Bennett | G06Q 10/1053 |
| | | | | 705/319 |
| 2017/0195457 | A1* | 7/2017 | Smith, II | H04L 63/102 |
| 2017/0351909 | A1* | 12/2017 | Kaehler | G06K 9/00281 |
| 2017/0364920 | A1* | 12/2017 | Anand | H04L 63/0861 |
| 2018/0055312 | A1* | 3/2018 | Jung | A47L 7/0066 |

* cited by examiner

*Primary Examiner* — Tongoc Tran
(74) *Attorney, Agent, or Firm* — Thorpe North & Western, LLP.

(57) ABSTRACT

A technology is described for evaluating object data associated with an object represented in an augmented environment. An example method may include detecting an object located within range of a proximity of a sensor included in a device configured to display object data for the object in an augmented environment display. The object data associated with the object may be requested and the object data may be authenticated using an authenticating authority that certifies that the object data is valid and/or by determining that an object attribute represented by the object data corresponds to the object attribute represented by sensor data obtained from the sensor. After the object data has been authenticated, the object data, or a portion of the object data may be displayed in the augmented environment display generated by the device.

20 Claims, 9 Drawing Sheets

AUGMENTED REALITY DATA EXCHANGE

BACKGROUND

The advent of augmented reality technologies has resulted in the ability to augment a view of a physical environment with computer-generated sensory input. For example, augmented reality can be used to add graphics, sounds, haptic feedback, and geographical location data to the natural world as experienced by a user of a computing device. The augmentation of a physical environment may blur the line between what a user may experience as real and what may be computer-generated by enhancing what a user may see, hear, feel, and even smell.

Augmentation of a physical environment may be performed at view time, namely, at the time a user is viewing the physical environment using a computing device. Augmented reality may include combining semantic context with environmental elements, such as sports scores displayed on augmented reality glasses during a sports match or product information displayed when a product is viewed.

DETAILED DESCRIPTION

A technology is described for a data exchange protocol used to validate and filter data associated with extrinsic objects displayed in an augmented environment that may include both physical objects and computer generated objects. An AR (Augmented Reality) device may be configured to include one or more sensors (e.g., a camera, microphone, GPS (Global Positioning System) module, accelerometer, wireless communication module, as well as other sensors) that may be used in generating and displaying an augmented environment on the AR device. An AR device may include: hand held devices, mobile devices, head-mounted devices (e.g., eyeglasses, contact lenses, and virtual retinal displays), HUDs (Head-Up Displays), and other devices configured to display an augmented environment.

Physical objects may be configured to be detectable by an AR device sensor when the AR device is in proximity of the physical object. For example, a physical object may be an electronic device that includes an interactive device, such as a RFID (Radio Frequency Identification) module, a BLUETOOTH module, a WI-FI module, NFC (Near-Field Communication) module, and/or like interactive devices. Also, a physical object may be a non-electronic object associated with an interactive device, such as an RFID tag, beacon (e.g., WI-FI or BLUETOOTH), optical code (e.g., bar code or QR (Quick Response) code), or like devices. A physical object (via an interactive device) may provide an AR device with object data that includes object related information that can be included in an augmented environment display generated by the AR device. As an illustration, an office building may have an interactive device located at the entrance that provides an AR device with a building directory that can be displayed in an augmented environment generated by the AR device. Also, interactive devices may be associated with virtual objects (e.g., virtual advertisements, virtual assistants, etc.) that can be displayed in an augmented environment when an AR device is in proximity to the interactive device.

Object data that represents itself as being associated with an object within view of an AR device may be authenticated to determine the validity of the object data (e.g., whether the object data is actually associated with the object). By authenticating the object data, false or misleading information may be identified and discarded, preventing the information from being displayed in an augmented environment. Also, object data can be filtered based on user preferences. As such, a user can specify the types and amounts of information associated with objects that the user wants displayed in an augmented environment.

Figure 1:
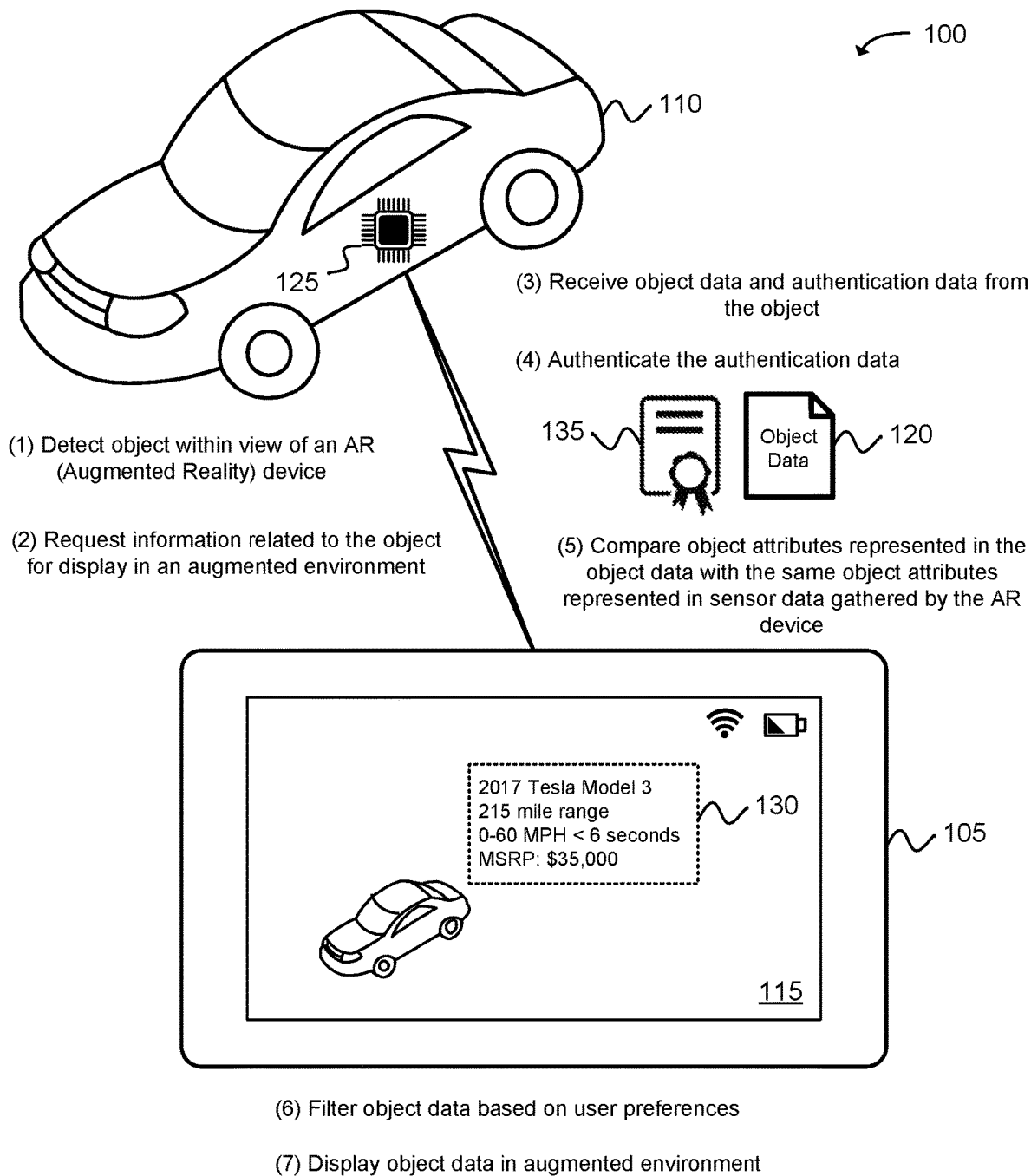
FIG. 1 is a diagram illustrating an example method for authenticating object data associated with an object that is in proximity of a sensor included in an AR (Augmented Reality) device.

FIG. 1 is a diagram illustrating an example of a method 100 for authenticating object data 120 obtained from an interactive device 125 claiming to be associated with an object 110 that is in proximity of a sensor included in an AR device 105. As illustrated, an object 110 configured to include an interactive device 125 may be detected by a sensor included in an AR device 105 when the AR device 105 is in proximity of the object 110 that allows the sensor to detect the interactive device 125. As a specific example, the object 110 may be an automobile that includes an interactive device 125 (e.g., WI-FI, BLUETOOTH, or NFC). The interactive device 125 included in the automobile may be detected by a wireless communication module included in the AR device 105 that is within a range of the interactive device 125 included in the automobile that allows the wireless communication module in the AR device 105 to detect the interactive device 125 included in the automobile.

After detecting the interactive device 125 associated with the object 110, the AR device 105 may be configured to request object data 120 associated with the object 110. The object data 120 may include object information 130 that can be displayed in an augmented environment 115 generated by the AR device 105. The interactive device 125 may be configured to provide the object data 120 (or pre-data used to authenticate the identity of the object 110) to the AR device 105. In one example, the interactive device 125 may provide object data 120 stored on the interactive device 125 itself or object data 120 stored in an attached storage, and/or the interactive device 125 may provide a reference (e.g., a URI (Uniform Resource Identifier)) that may be used by the AR device 105 to obtain the object data 120 from a data service provider. The object data 120 provided by the interactive device 125 may include object information 130 that provides context for an object 110 included in an augmented environment 115. The object information 130 may be displayed in the augmented environment 115 relative to the object 110, thereby providing an AR device 105 user with context for the object 110. As an illustration, object data 120 associated with an automobile may include automobile information that can be displayed relative to the automobile displayed in an augmented environment generated by an AR device 105 providing a user with information about the automobile.

Prior to displaying object information 130 included in the object data 120 in an augmented environment 115 generated by the AR device 105, the object data 120 may be authenticated in order to provide a level of assurance that the interactive device 125 providing the object data 120 is actually associated with the object 110. In one example, a request for object data 120 sent to an interactive device 125 may include a request for authentication data used to authenticate the object data 120. In response to receiving the request, the interactive device 125 may be configured to send the authentication data to the AR device 105, and the authentication data may be used by the AR device 105 to authenticate the object data 120 provided by the interactive device 125.

One or more types of authentication may be used to authenticate object data 120 prior to displaying object information 130 included in the object data 120 in an augmented environment 115. In one example, certificate authentication may be used to authenticate object data 120. For example, an AR device 105 may request that an interaction device 125 provide a digital certificate 135 that may be used to authenticate object data 120 provided by the interactive device 125. Illustratively, the digital certificate 135 may include information for a public key included in the digital certificate 135, information about an interactive device's identity, and a digital signature of an entity (e.g., a certificate authority) that has verified that the digital certificate's contents are correct. The digital certificate 135 may be validated using a certificate authentication technique (e.g., validating the digital signature). In the case that the digital certificate 135 is successfully validated, the identity of the interactive device 125 and the object data 120 provided by the interactive device 125 may be considered valid.

In one example, a digital certificate 135 may include an embedded token that provides access to the object data 120 for a specified time period. For example, the token may provide access to object data 120 stored on the object 110 (e.g., computer memory or a storage device included in an object 110), or the token may provide access to object data 120 managed by a data service provider. As an example, an AR device 105 may request a digital certificate 135 that includes an embedded token and after authenticating the digital certificate 135, the AR device 105 may present the token to a data service provider within the specified time period and the data service provider may provide the object data 120 to the AR device 105.

In another example, object data 120 may be authenticated by comparing object attributes included in the object data 120 with sensor data obtained from one or more of the sensors included in an AR device 105 to determine whether an object attribute of the object 110 represented by the object data 120 corresponds to the same object attribute represented by the sensor data. In other words, if object attributes represented by the object data 120 match object attributes represented by the sensor data, then the object data 120 provided by the interactive device 125 may be considered valid. In one example, object data 120 may include metadata describing various attributes of an object 110. Sensors included in an AR device 105 may be used to collect sensor data, from which metadata may be obtained that describes the various attributes of the object 110. One or more of the attributes included in the metadata obtained from the object data 120 may be compared to the attributes included in the metadata obtained from the sensor data, and if most, or at least a substantial number of the values of the corresponding attributes match one another, then the object data 120 may be considered valid.

As a specific example, object data 120 for an automobile may include metadata describing various observable features of the automobile, such as color, make, model, year, and state of the automobile (engine on/off, moving/stationary, geographic location). Sensors included in an AR device 105 may be used to collect sensor data associated with the automobile. For example, sensor data obtained by a camera may be analyzed to identify the color, make, model, and year of the automobile; sensor data obtained by a microphone may be analyzed to identify the state of the automobile (engine on/off, moving/stationary); and sensor data obtained by a GPS module may be used to identify a geographic location of the automobile reported by the automobile. Corresponding attributes represented by the object data 120 and the sensor data may then be compared to determine whether the values of the attributes match. For example, a color attribute represented by the object data 120 may be compared to a color attribute represented by the sensor data to determine whether the colors match. In the case that most, or a substantial number of the corresponding attributes match (e.g., color, model, make, and automobile state), the object data 120 may be considered valid.

In some examples, object attributes obtained from sensor data used to determine the validity of the object data 120 may be weighted according to a probability of misidentification of the attribute. For example, attributes having a lower probability of misidentification may be given more weight as compared to attributes having a higher probability of misidentification. As a specific example, a make and model of an automobile may be given greater weight due to a lower probability of misidentification (e.g., there may be a lower probability of classifying a truck as a sports car) as compared to a weight given to a color of the automobile due to a higher probability of misidentification (e.g., there may be a higher probability of misclassifying a blue car as a black car due to lighting conditions). Accordingly, weightings assigned to object attributes may be considered in authenticating object data 120, such that object attributes assigned greater weightings may have a greater influence in determining the validity of the object data 120. As an illustration, an automobile attribute set that includes matching make and model attributes and non-matching color attributes may be deemed to be valid based in part on the weightings assigned to the make, model, and color attributes, whereas an attribute set that includes matching color attributes and non-matching make and model attributes may be deemed to be invalid.

In another example, object data 120 may be authenticated using reputation data associated with the object data 120 that may be provided by a community of object data reviewers. A community of object data reviewers may include users (e.g., public and/or professional reviewers) that provide opinions regarding the object data 120. For example, AR device users may submit reputation data (e.g., reviews) for object data 120 encountered by the users into a centralized data store (not shown). The reputation data may be made available to other AR device users and the reputation data may be used in evaluating the object data 120 when the users encounter the object 110. The community of object data reviewers may include a user's social group that provides opinions regarding the validity of the object data 120. The user may trust the opinions provided by the user's social group over the opinions of other users included in a community of object data reviewers. Also, social groups may rate whether object data may be relevant to the group (e.g., a group of automobile enthusiasts may rate object data 120 for automobiles). Illustratively, reputation data may provide a general consensus of object data validity (e.g., "valid", "questionable", or "not valid"), or the reputation data may provide a validity score (e.g., 1 to 10) for the object data 120. A user may indicate a validity level or validity score that the user is willing to accept. In the case that reputation data associated with object data 120 satisfies a reputation data threshold set by a user, the object data 120 may be considered valid.

As already mentioned, multiple types of authentication may be used to authenticate object data 120 provided by an interactive device 125. For example, object data 120 may be authenticated using various combinations of certificate authentication, attribute comparison authentication, and reputation data authentication, as described above. In using multiple types of authentication to validate object data 120, a validation score may be assigned to the object data 120, which can be used to determine whether or not to display object information 130 included in the object data 120 in an augmented environment 115. In one example, a validation score may be calculated and assigned to object data 120 based in part on the results of individual authentications performed for the object data 120. Illustratively, a validation score may be a "pass-fail" score, a numeric score, or some other type of score. Various methods may be used to calculate a validation score. For example, a validation score may be calculated by taking the sum, average, mean, or median of individual validation scores for individual authentications performed using separate authentication types. Also, individual validation scores may be weighted according to a type of authentication used to authenticate object data 120. For example, certificate authentication may be given greater weight as compared to a weight given to reputation data authentication.

After assigning a validation score to object data 120 provided by an interactive device 125, a determination may be made whether the validation score satisfies a validation score threshold that allows object information 130 included in the object data 120 to be displayed in an augmented environment 115 generated by an AR device 105. A user may set the validation score threshold to coincide with the user's preferences. For example, if a user wants to see object information 130 that has a higher confidence of being associated with an object 110, the user may set a higher validation score threshold. Whereas, if the user is less concerned whether the object information 130 is actually associated with the object 110, the user may set a lower validation score threshold.

In one example, a user may specify the authentication types that are used to authenticate object data 120. For example, a user may specify that certificate authentication be used in combination with attribute comparison authentication, and/or reputation data authentication. Also, a user may specify the parameters of an authentication method. For example, a user may specify that reviews submitted by a trusted social group be used for reputation authentication of object data 120.

After the object data 120 has been authenticated, object information 130 included in the object data 120 may be displayed in an augmented environment 115 generated by an AR device 105. The object information 130 may be positioned in the augmented environment 115 in relation to an object 110 that is displayed in the augmented environment 115, such that the object information 130 may be associated with the object 110.

In displaying objects 110 in an augmented environment 115, in some examples, an object filtering parameter may be used to specify what types of objects 110 to display in the augmented environment 115. For example, a user may control which objects 110 (physical and/or virtual) the user wants displayed. As a specific example, a user may block all or selected billboards (e.g., virtual billboards and/or physical billboards) from being displayed in an augmented environment 115. Illustratively, physical objects may be filtered from an augmented environment display using object recognition software that may be configured to recognize a physical object in an image captured by a camera and remove the physical object from the image.

Also, a user may control what type or detail level of object information 130 to display in the augmented environment 115 using a data filtering parameter. Users may have the ability to choose from various levels of object information 130 to display. For example, a user may choose a summary level that includes basic details for an object 110, or a detailed level that includes additional details associated with the object 110. As an illustration, summary level object information 130 for an automobile may include a year, make, and model of an automobile, and detailed level object information 130 for the automobile may include additional details like engine specifications, performance specifications, and retail price.

A data filtering parameter may be applied globally to any object 110 that may be detected by an AR device 105, and/or data filtering parameters may be applied to classes of objects 110 detected by the AR device 105. For example, a user may set a global data filtering parameter to display summary or detailed object information 130 for all objects 110 detected by an AR device 105, or the user may set individual data filtering parameters for classes of objects to display summary or detailed object information 130.

Figure 2:
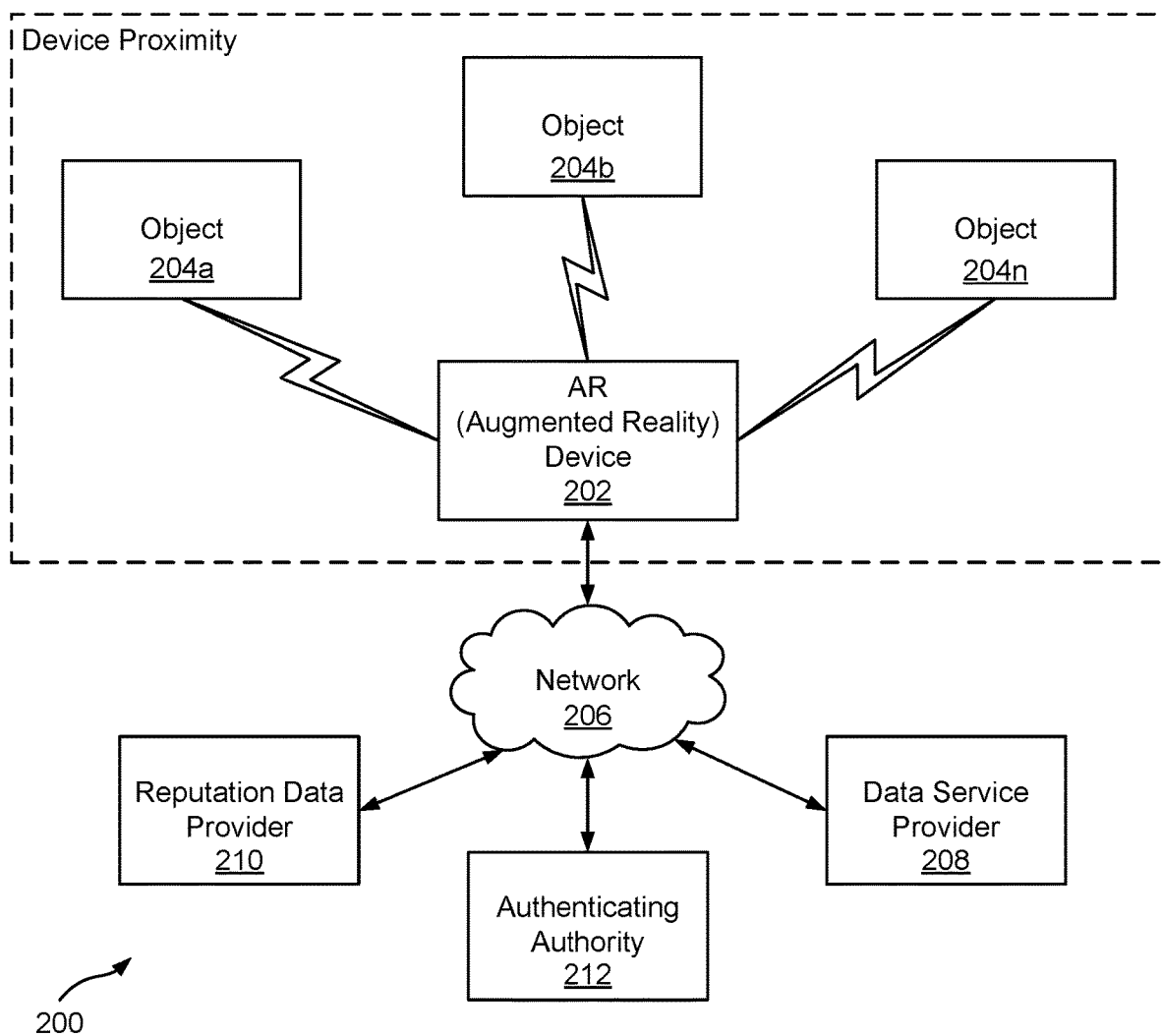
FIG. 2 is a block diagram that illustrates a system used to implement a data exchange protocol used to authenticate object data for inclusion in an augmented environment display generated by an AR device.

FIG. 2 is a block diagram illustrating an example system 200 used to implement a data exchange protocol and used to authenticate object data for inclusion in an augmented environment display generated by an AR device 202. The system 200 may include an AR device 202 configured to detect objects 204*a-n* that are within a proximity of one or more AR device sensors that enables the AR device sensors to detect an object 204*a-n* and request object data associated with the object 204*a-n*.

In one example, the AR device 202 may be configured to detect an object 204*a-n* and request object data associated with the object 204*a-n* from the object 204*a-n* itself and/or from a data service provider 208. For example, an object 204*a-n* (or an interactive device associated with an object 204*a-n*) may be configured to store object data and transmit the object data to an AR device 202 in response to a request for the object data. Also, an object 204*a-n* may be configured to provide a reference that allows an AR device 202 to obtain object data from a data service provider 208.

A data service provider 208 may include a network service (e.g., a content delivery network) that manages the storage and delivery of object data. The network service may be managed by an object owner, or the network service may manage the object data on the object owner's behalf. Various scenarios may call for obtaining object data from a data service provider 208. As one example, supplemental object data may be obtained from a data service provider 208 and the supplemental object data may be included with object data received from an object 204*a-n*. For example, detecting an interactive device associated with a bus stop may cause an AR device 202 to use an identifier included in bus stop information provided by the interactive device to obtain a current bus stop schedule from a data service provider 208 and display the schedule along with the bus stop information and the busses' progress in an augmented environment. As another example, an object 204*a-n* may be identified using sensor data (e.g., an image captured by a camera) and object data for the object may be obtained from a data service provider 208. For example, a product bearing a manufacturer label or trademark may be identified in an image captured by an AR device camera and product information about the product may be obtained from a manufacture's data service and the product information may be included in the AR device's augmented environment display.

Object data obtained by an AR device 202 may be authenticated using the authentication methods described earlier. In one example, an AR device 202 may request authentication data (e.g., a digital certificate, object metadata, and/or reputation data) that can be used to authenticate the object data. The authentication data may be provided by an object 204*a-n*, a data service provider 208, an authenticating authority 212, and/or a reputation data provider 210.

An authenticating authority 212 may be an entity that certifies the validity of object data (i.e., certifies that object data claiming to be associated with an object 204*a-b* is actually associated with the object 204*a-n*). The authenticating authority 212 may be a trusted entity that vouches for the identity of an object data provider. In one example, the authentication authority 212 may be a certificate authority that issues digital certificates used to authenticate object data claiming to be associated with an object 204*a-n*. A certificate authority may issue a digital certificate to an object data provider that contains a public key of the object data provider, a certificate authority signature, and the identity of the object data provider. A corresponding private key may not be made available publicly, but may be kept secret by the object data provider who generated or obtained the public/private key pair. The digital certificate may act as a confirmation or validation by the certificate authority that the public key contained in the digital certificate belongs to the object data provider identified in the digital certificate. In other words, the certificate authority via the digital certificate certifies that an object data provider is who they claim to be. If a user (or AR device 202) trusts the certificate authority and can verify the certificate authority's signature included in a digital certificate, then the user can assume that a public key included in the digital certificate belongs to the object data provider identified in the digital certificate.

A digital certificate issued by a certificate authority may be stored on an object 204*a-n* and the object 204*a-n* may present the digital certificate to an AR device 202 upon request. Alternatively, a digital certificate may be stored by a data service provider 208. In response to a request from an AR device 202, an object 204*a-n* may provide the AR device 202 with a reference (e.g., URI) that may be used to retrieve the digital certificate from the data service provider 208.

A reputation data provider 210 may be an entity that collects and manages reputation data associated with object data. In one example, a community of object data reviewers may submit reviews for object data claiming to be associated with an object 204*a-n*. The reviews may include user opinions about the credibility of object data based in part on observations made by the object data reviewers. For example, an object data reviewer may indicate that object data claiming to be associated with an object 204*a-n* corresponds to the object 204*a-n*, or bears no or little relation to the object 204*a-n*. The data object reviewers may use a rating system to review object data, such as a simple "pass-fail" rating system or a scaled rating system (e.g., 1 to 10 rating). Reputation data generated by the object data reviewers may be submitted to the reputation data provider 210, and the reputation data provider may make the reputation data available to AR devices 202.

As another example, an AR device 202 may be configured to submit reputation data to a reputation data provider 210. In one example, reputation data submitted by an AR device 202 may coincide with a validation score assigned to object data that has been evaluated. For example, as described earlier, a validation score may be calculated and assigned to object data claiming to be associated with an object 204*a-n* and the validation score may be used in a decision to include the object data in an augmented environment display. The validation score assigned to the object data may be sent to the reputation data provider 210 and the validation score may be made available to other AR devices 202 that encounter the object 204*a-n* and are presented with the object data.

Figure 3:
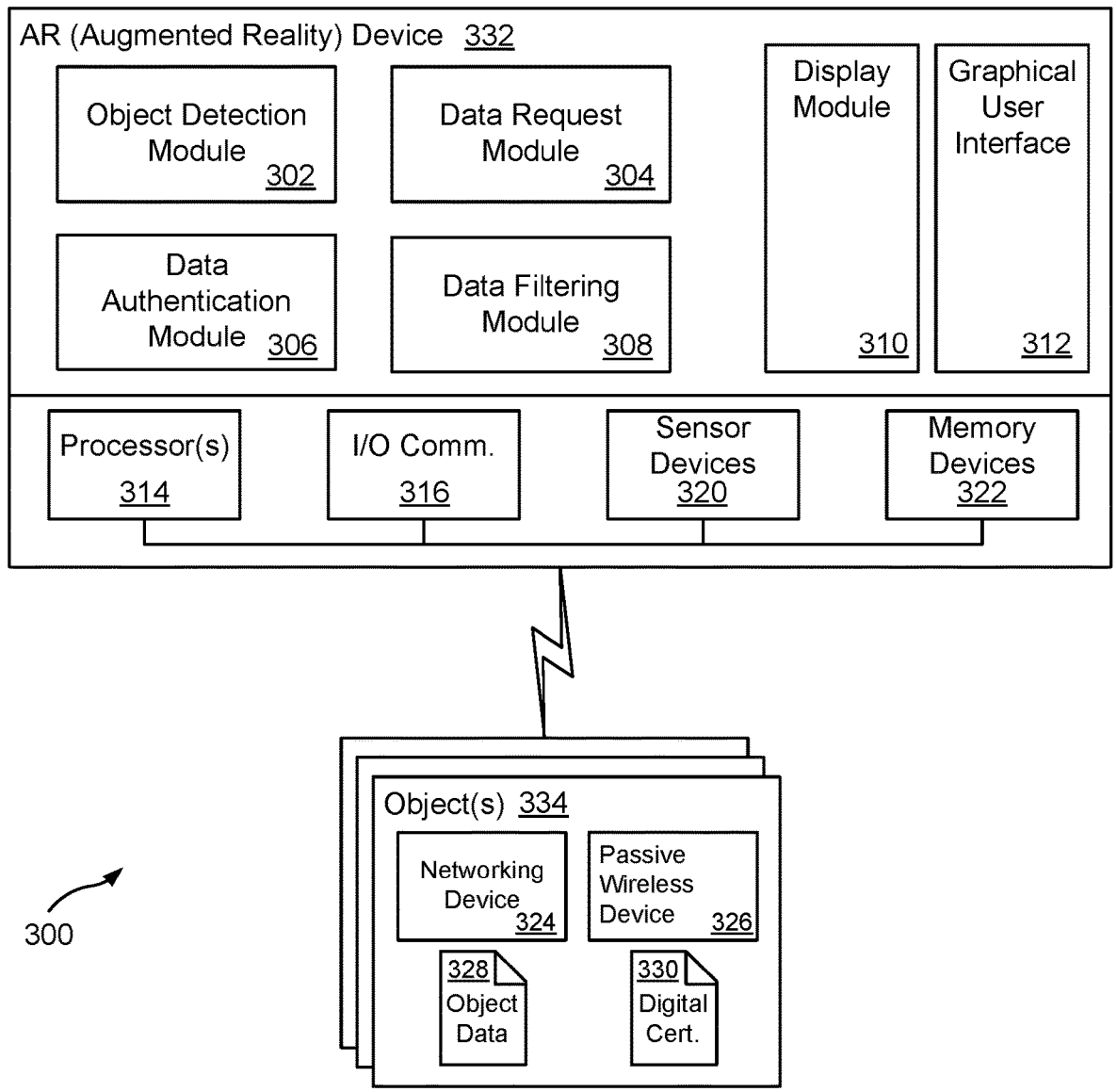
FIG. 3 is a block diagram that illustrates various example components included in a system for evaluating object data associated with an object represented in an augmented environment.

FIG. 3 illustrates components of an example system 300 on which the present technology may be executed. The system 300 may include an AR device 332 configured to generate an augmented environment display that includes object data 328 associated with an object 334 detected by the AR device 332. As illustrated, the AR device 332 may include a number of modules that may include an object detection module 302, a data request module 304, a data authentication module 306, a data filtering module 308, and a display module 310.

The object detection module 302 may be configured to detect objects within proximity of the AR device 332 using one or more sensor devices 320. Sensor devices 320 included in the AR device 332 may include, but are not limited to: cameras, microphones, GPS modules, accelerometers, networking devices (e.g., WI-FI, BLUETOOTH, NFC, and/or cellular module), and other types of sensors. An object 334 may include an interactive device that may be detectable by a sensor device 320. For example, an interactive device included in an object 334 may include a networking device 324 (e.g., WI-FI, BLUETOOTH, NFC, and/or cellular module) and/or a passive wireless device 326 (e.g., an RFID tag or module). A sensor device 320 included in the AR device 332 may detect an interactive device included in an object 334 that is within a detection range of the sensor device 320. After detecting an object 334, the object detection module 302 may be configured to generate a notification indicating that the object 334 has been detected and send the notification to the data request module 304.

The object detection module 302 may also be configured to detect when an object 334 is no longer in proximity of a sensor device 320 included in the AR device 332. For example, after determining that an object 334 is not within a detection range of an AR device's sensors, the object detection module 302 may send a notification to a display module 310 that then removes object information from an augmented environment generated by the AR device 332.

The data request module 304 may be configured to send a data request to an object 334 detected by the object detection module 302. The data request may be for object data 328 and a digital certificate 330 that may be used to authenticate the object data 328. In one example, the object data 328 may include metadata that describes the various attributes of the object 334 and may include context data for the object 334 that can be displayed in an augmented environment generated by the AR device 332. In response to receiving the data request, the object 334 may send the object data 328 and the digital certificate 330 to the AR device 332, and the object data 328 and the digital certificate 330 may be stored in a memory device 322. The data request module 304 may be configured to send a notification to the data authentication module 306 requesting that the object data 328 stored in the memory device 322 be authenticated.

The data authentication module 306 may be configured to evaluate object data 328 to determine whether the object data 328 is valid (e.g., actually associated with an object 334). The authentication methods described in association with FIG. 1 may be utilized by the data authentication module 306 to authenticate object data 328. For example, certificate authentication, attribute comparison authentication, reputation data authentication, and combinations thereof may be used to authenticate object data 328 provided by an object 334. In one example, in response to a notification sent by the data request module 304, the data authentication module 306 may be configured to retrieve a digital certificate 330 from a memory device 322 and validate the digital certificate 330. In the case that the digital certificate 330 is successfully validated, the object data 328 may be considered valid. Additional authentication may be performed. For example, attributes described in the metadata included in the object data 328 may be compared to corresponding attributes identified in sensor data obtained using sensor devices 320 included in the AR device 332. Also, reputation data associated with the object data 328 may be obtained from a community of object data reviewers and the reputation data may be evaluated to determine a general consensus whether the object data 328 is valid.

A decision to include the object data 328 in an augmented environment display may be made based in part on the results of the various authentications. For example, the data authentication module 306 may be configured to generate a validation score and assign the validation score to the object data 328. The validation score may then be provided to a data filtering module 308 that may be used to identify object data 328 that may be displayed in an augmented environment based on authentication of the object data 328 and a user's preferences.

In one example, the data filtering module 308 may be configured to determine whether a validation score assigned to object data 328 satisfies a validation score threshold for displaying the object data 328 in an augmented environment generated by the AR device 332. A user may control a level of authentication used by setting a validation score threshold to a value that matches the user's specifications. A user may also be provided with control over what types of objects 334 and what type of object data 328 may be displayed in an augmented environment display by setting object filtering parameters and data filtering parameters to the user's specifications. In the case that the validation score satisfies the validation score threshold and is in line with the user's filtering specifications, the display module 310 may be instructed to include the object data 328, or a portion of the object data 328 in the augmented environment in respect to the object 334 displayed in the augmented environment.

As illustrated, the AR device 332 may include a display module 310 that may be used to render object data 328 and in some cases, objects 334, on an AR device display. An AR device display may include optical projection systems, monitors, hand held devices, and display systems worn on the human body. An interactive graphical user interface 312 may be provided using the AR device display. An AR device 332 may include one or more processors 314, memory devices 322, and Input/Output (I/O) device communication 316 to enable communication between hardware devices and I/O components. Networking devices may be provided for communication across a network with remote computing devices, such as data service providers. The networking devices may provide wireless networking access. Examples of wireless network access may include cellular network access, WI-FI network access, or similar network access.

Figure 4:
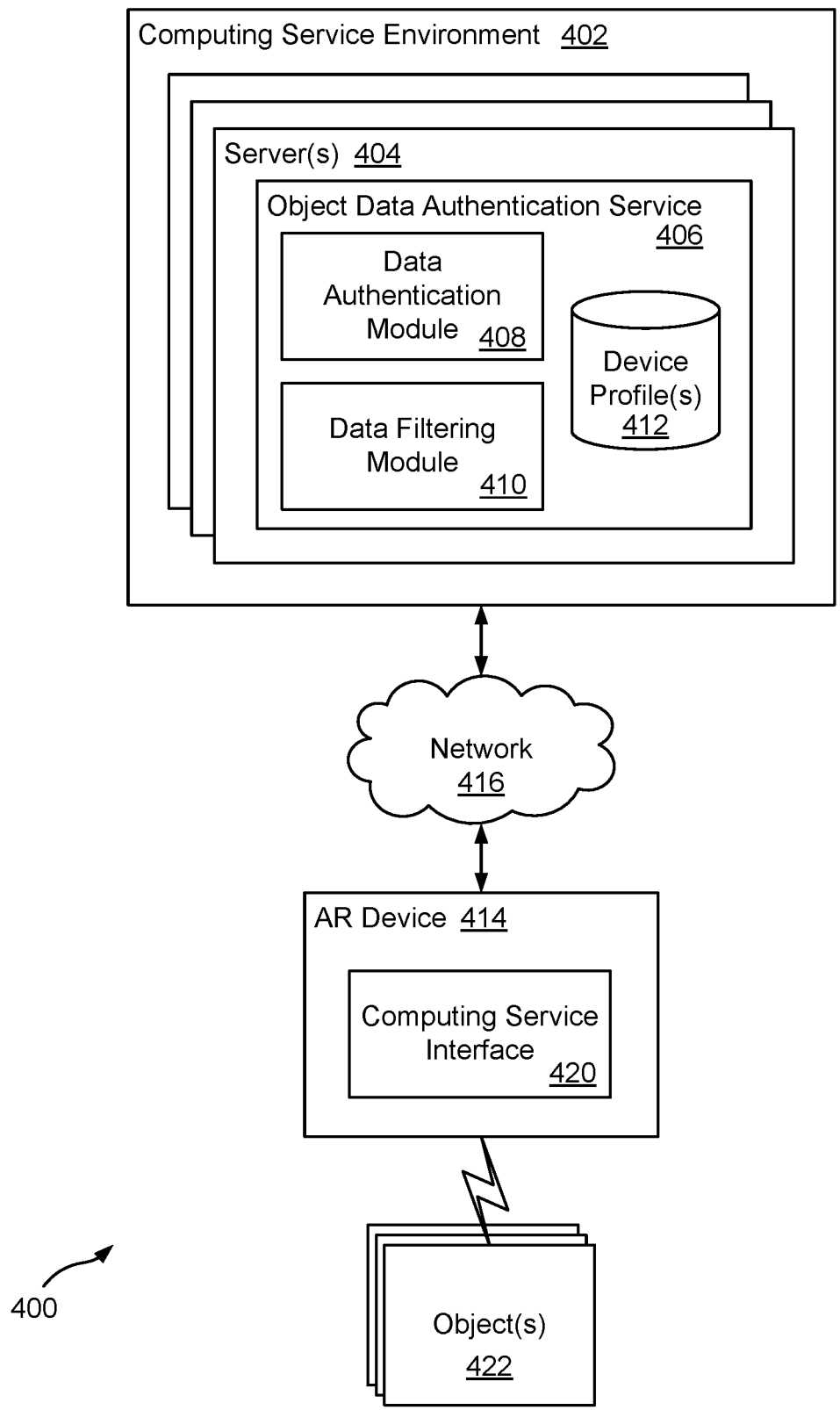
FIG. 4 is a block diagram illustrating a system for authenticating object data using components included in a computing service environment.

FIG. 4 is a block diagram that illustrates an example system 400 in which an AR device 414 may be in network communication with a computing service environment 402 that hosts an object data authentication service 406 on one or more servers 404. The object data authentication service 406 may be configured to authenticate and filter object data claiming to be associated with objects 422 encountered by the AR device 414. Hosting the object data authentication service 406 in the computing service environment 402 may decrease the processing workload of an AR device 414, and may provide benefits in cases where the AR device 414 may be configured with limited computing resources.

The object data authentication service 406 may include a data authentication module 408 and a data filtering module 410 that perform the functions described in association with FIG. 3. The AR device 414 may be configured to communicate with the object data authentication service 406 using a computing service interface 420. For example, after detecting an object 422 and requesting object data from the object 422, the AR device 414 may send a request to the object data authentication service 406 via the computing service interface 420 requesting that the object data be authenticated and filtered using a device profile 412 associated with the AR device 414.

In an example where the object 422 sends authentication data and object data to the AR device 414, the AR device 414 may forward the authentication data and object data to the object data authentication service 406. In an example where the object 422 provides the AR device 414 with a reference (e.g., a URI) that may be used to retrieve the authentication data and object data, the AR device 414 may forward the reference to the object data authentication service 406, which may then retrieve the authentication data and object data using the reference.

The object data authentication service 406 may authenticate the object data using the data authentication module 408 and perform filtering of the object data using the data filtering module 410 and send instructions to the AR device 414 via the computing service interface 420 for displaying the object data. For example, the AR device 414 may be instructed whether to display the object data, and if so, what portions of the object data to display.

Figure 5:
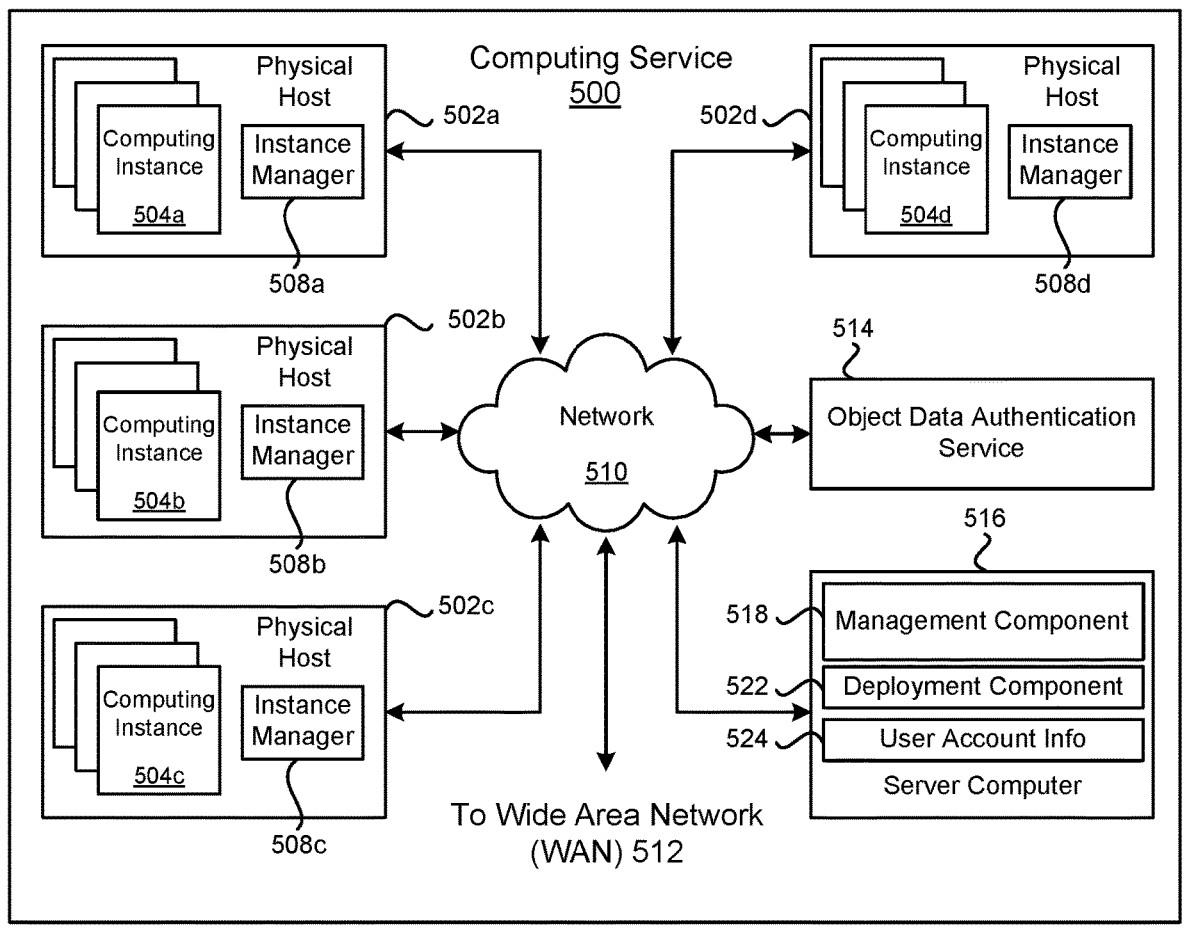
FIG. 5 is a block diagram that illustrates an example computing service environment that includes an object data authentication service.

The computing service environment 402 may include computing resources for executing computing instances (e.g., virtual machines) as described in greater detail in association with FIG. 5. The various processes and/or other functionality contained within the computing service environment 402 may be executed on one or more processors that are in communication with one or more memory modules. The computing service environment 402 may include a number of computing devices that are arranged, for example, in one or more server banks or computer banks or other arrangements. The computing devices may support a computing environment using hypervisors, virtual machine monitors (VMMs) and other virtualization software.

A network 416 providing access to the computing service 402 may include any useful computing network, including an intranet, the Internet, a local area network, a wide area network, a wireless data network, or any other such network or combination thereof. Components utilized for such a system may depend at least in part upon the type of network and/or environment selected.

FIGS. 3 and 4 illustrate that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIGS. 2, 3 and 4 illustrate examples of systems that may implement the techniques above, many other similar or different environments are possible. The example environments discussed and illustrated above are merely representative and not limiting.

FIG. 5 is a block diagram illustrating an example computing service 500 that may be used to execute and manage a number of computing instances 504a-d. In particular, the computing service 500 depicted illustrates one environment in which the technology described herein may be used. The computing service 500 may be one type of environment that includes various virtualized service resources that may be used, for instance, to host computing instances 504a-d.

The computing service 500 may be capable of delivery of computing, storage and networking capacity as a software service to a community of end recipients. In one example, the computing service 500 may be established for an organization by or on behalf of the organization. That is, the computing service 500 may offer a "private cloud environment." In another example, the computing service 500 may support a multi-tenant environment, wherein a plurality of users may operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may be provided. For the IaaS model, the computing service 500 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 500. End users may access the computing service 500 using networked client devices, such as desktop computers, laptops, tablets, smartphones, etc. running web browsers or other lightweight client applications, for example. Those familiar with the art will recognize that the computing service 500 may be described as a "cloud" environment.

The particularly illustrated computing service 500 may include a plurality of server computers 502a-d. While four server computers are shown, any number may be used, and large data centers may include thousands of server computers. The computing service 500 may provide computing resources for executing computing instances 504a-d. Computing instances 504a-d may, for example, be virtual machines. A virtual machine may be an instance of a software implementation of a machine (i.e. a computer) that executes applications like a physical machine. In the example of a virtual machine, each of the server computers 502a-d may be configured to execute an instance manager 508a-d capable of executing the instances. The instance manager 508a-d may be a hypervisor, virtual machine monitor (VMM), or another type of program configured to enable the execution of multiple computing instances 504a-d on a single server. Additionally, each of the computing instances 504a-d may be configured to execute one or more applications.

One or more server computers 514 and 516 may be reserved to execute software components for managing the operation of the computing service 500 and the computing instances 504a-d. For example, a server computer 514 may execute an object data authentication service configured to authenticate and filter object data claiming to be associated with an object detected by an AR device.

A server computer 516 may execute a management component 518. A user may access the management component 518 to configure various aspects of the operation of the computing instances 504a-d purchased by a user. For example, the user may setup computing instances 504a-d and make changes to the configuration of the computing instances 504a-d.

A deployment component 522 may be used to assist users in the deployment of computing instances 504a-d. The deployment component 522 may have access to user account information 524 associated with the computing instances 504a-d. The deployment component 522 may receive a configuration from a user that includes data describing how computing instances 504a-d may be configured. For example, the configuration may include an operating system, provide one or more applications to be installed in computing instances 504a-d, provide scripts and/or other types of code to be executed for configuring computing instances 504a-d, provide cache logic specifying how an application cache should be prepared, and other types of information. The deployment component 522 may utilize the user-provided configuration and cache logic to configure, prime, and launch computing instances 504a-d. The configuration, cache logic, and other information may be specified by a user accessing the management component 518 or by providing this information directly to the deployment component 522.

A network 510 may be utilized to interconnect the computing service 500 and the server computers 502a-d, 516. The network 510 may be a local area network (LAN) and may be connected to a Wide Area Network (WAN) 512 or the Internet, so that end users may access the computing service 500. The network topology illustrated in FIG. 5 has been simplified, many more networks and networking devices may be utilized to interconnect the various computing systems disclosed herein.

Figure 6:
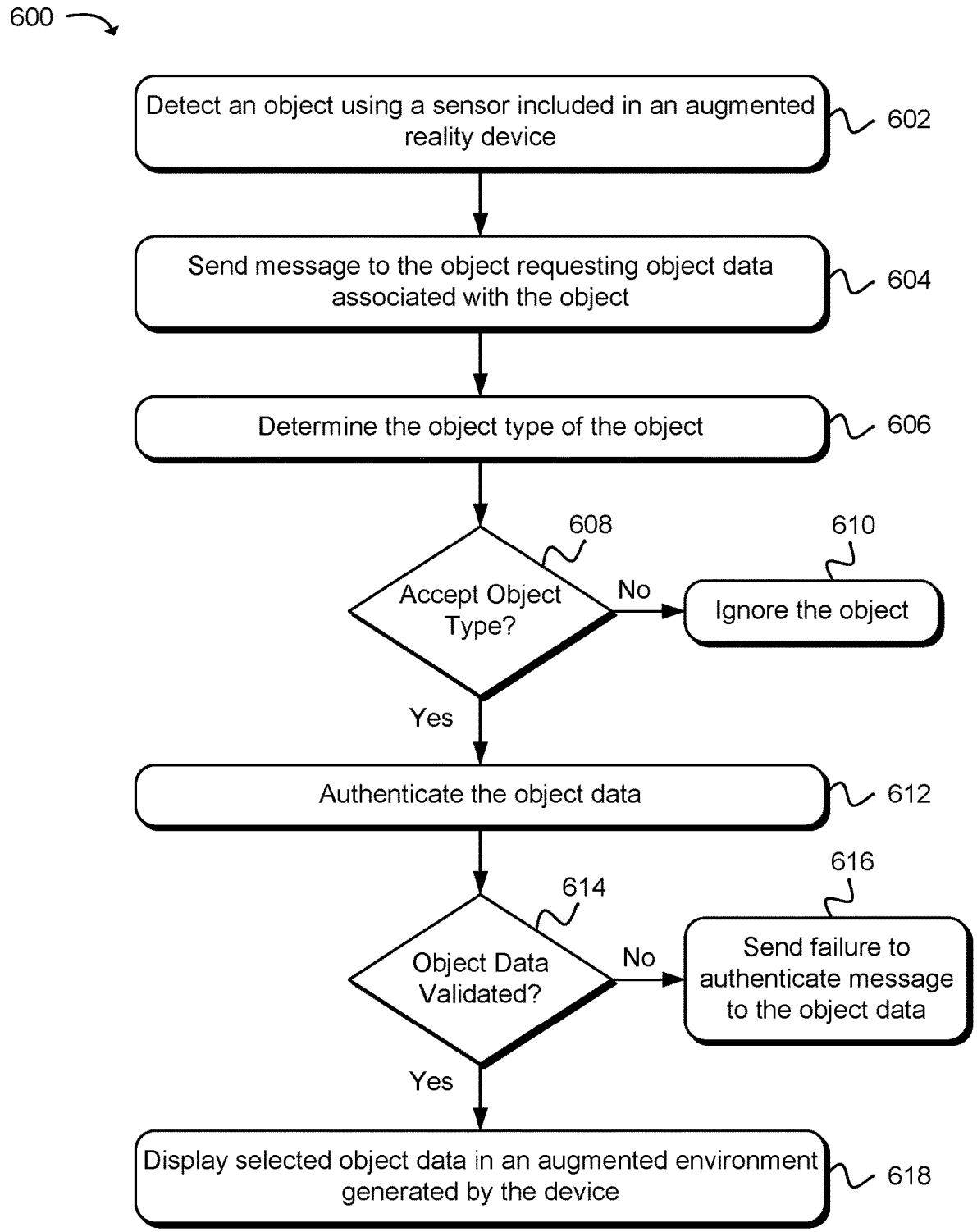
FIG. 6 is a flow diagram illustrating an example method for evaluating an object and object data associated with the object.

Moving now to FIG. 6, a flow diagram illustrates an example method 600 for evaluating an object and object data associated with the object. Starting in block 602, an object may be detected by a sensor included in an AR device. Illustratively, the object may be detected using a network module (e.g., BLUETOOTH, NFC, or WI-FI), a camera, a microphone, or other sensor included in an AR device. The AR device may be within proximity of the object that allows the sensor to discover the presence of the object. The object may be configured with an interactive device that allows for communication with the AR device.

After detecting the object, as in block 604 the AR device may be configured to send a message to the object requesting object data associated with the object. In one example, the object itself may provide the requested object data. In another example, the object may be configured to provide a reference (e.g., URI) that can be used to retrieve the object data.

The object data may include metadata that describes the object. In particular, the object data may include metadata that describes an object type or object class (e.g., vehicles, structures, locations, people, or anything else that may be detectable by a sensor included in an AR device). As in block 606, the object type of the object may be determined based in part on the metadata included in the object data. In one example, sensor data may also be used to determine the object type of the object.

As in block 608, a determination may be made whether to accept the object data based in part on the type of the object. For example, an AR device user may set an object filtering parameter used to specify types of object data to display in an augmented environment display. As such, object data for object types not specified in the object filtering parameter may not be included in an augmented environment display. As a specific example, a user may add public transportation vehicles to an object filtering parameter, such that information associated with the public transportation vehicles (e.g., schedule, cost, available capacity, etc.) may be displayed in an augmented environment. Alternatively, a user may specify types of objects for which the user does not want to see object data (e.g., do not show information associated with public transportation vehicles).

In the case that the object data is associated with an object type that is not accepted for display in the augmented environment display generated by the AR device, the object data may be ignored, as in block 610. In the case that the object data is associated with an acceptable object type, then as in block 612, the object data may be authenticated using certificate authentication, attribute comparison authentication, and/or reputation data authentication as described earlier.

As in block 614, if authentication of the object data fails, then as in block 616, a message indicating the failure to authenticate the object data may be sent to the object. By sending the failure to authenticate message to the object, an owner of the object may be put on notice that authentication problems may be preventing object data from being displayed on AR devices. If authentication of the object data is successful, then as in block 618, a selection of the object data may be displayed in the augmented environment generated by the AR device. For example, the object data may be displayed in the augmented environment according to an AR device user's preferences, such as displaying a summary level or detailed level of information for an object.

Figure 7:
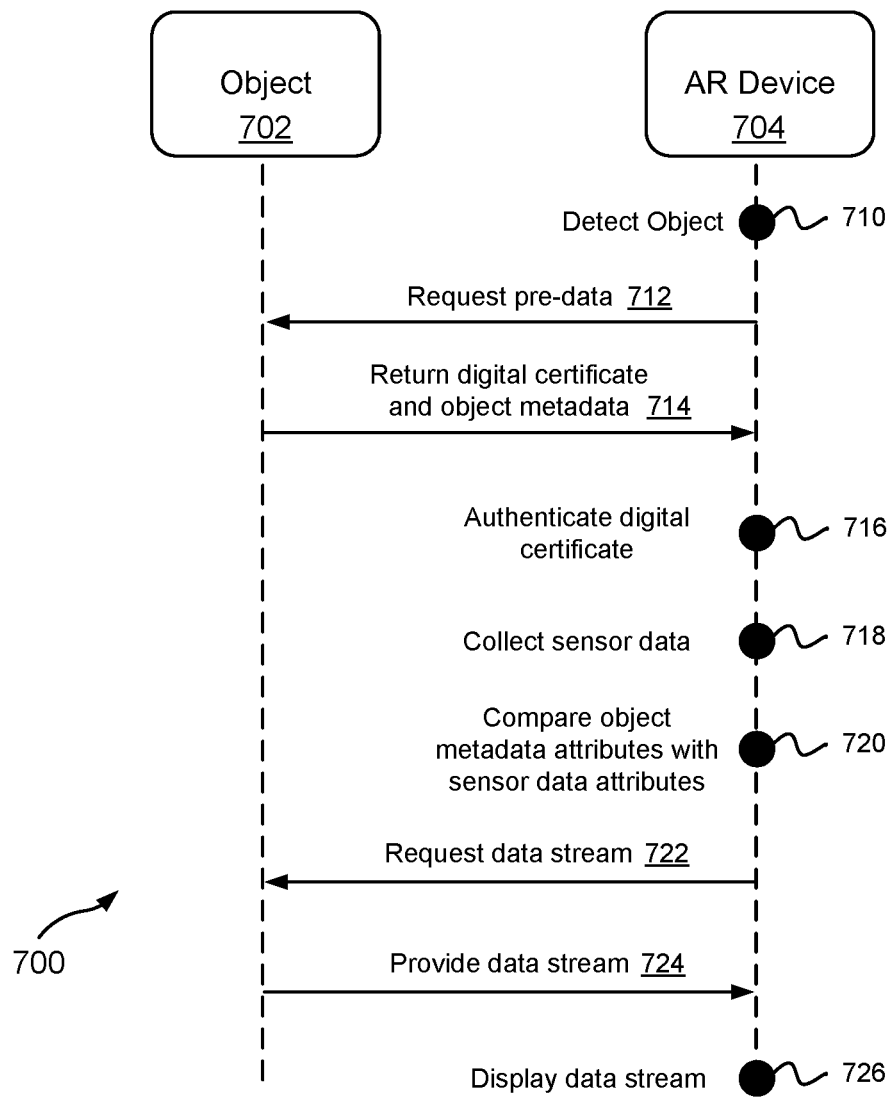
FIG. 7 is a sequence diagram illustrating an example method for authenticating a data stream associated with an object detected by an AR device.

FIG. 7 is a flow diagram illustrating an example method 700 for authenticating a provider of a data stream associated with an object 702 detected by an AR device 704. The object 702 may be configured to provide a data stream to AR devices 704 that are within a communication range of the object. As one example, the object 702 may provide a virtual assistant programmed to provide information and instructions related to a geographical location (e.g., an airport, museum, or library) to AR device users located within proximity of the object 702. As another example, the object 702 may include advertisement objects placed in public transportation channels (e.g., subways, busses, and taxis) that provide video advertisements to AR device users located within proximity of the object 702.

As illustrated, an AR device 704 may detect 710 an object 702 by way of one or more sensors included in the AR device 704. Having detected the object 702, the AR device 704 may be configured to request pre-data 712 from the object 702. The pre-data may be information that can be used to authenticate the identity of the object 702, such that a data stream that claims to be associated with the object 702 can be trusted. For example, an AR device user may encounter an object 702 in an airport claiming that the object 702 provides flight information for the airport. However, the AR device user has no assurances that the object 702 provides valid flight information for the airport without first authenticating the identity of the object 702.

Pre-data may include a digital certificate and object metadata, which may be returned 714 to the AR device 704 in response to the request 712 for the pre-data. The digital certificate may be authenticated 716 using certificate authentication. Sensor data generated by one or more sensors included in the AR device 704 may be collected 718 and the sensor data may be analyzed to identify object attributes represented in the sensor data. The object attributes represented in the sensor data may then be compared 720 to object attributes represented in the object metadata provided by the object 702 to determine whether the object attributes correspond with one another. As an example, an object 702 encountered at an airport may provide object metadata to an AR device 704 that includes location information for the object 702. The location information may be compared to GPS coordinates obtained from a GPS module included in the AR device 704 to determine whether the location information corresponds to the GPS coordinates.

After authenticating the pre-data provided by the object 702, the AR device 704 may request 722 a data stream from the object 702. As an example, after authenticating an object 702 located at an airport, an AR device 704 may request a flight information stream that can be displayed in an augmented environment display generated by the AR device 704. In response to the data stream request, the object 702 may provide 724 the data stream to the AR device 704 and the data stream may be displayed 726 in an augmented environment generated by the AR device 704.

Figure 8:
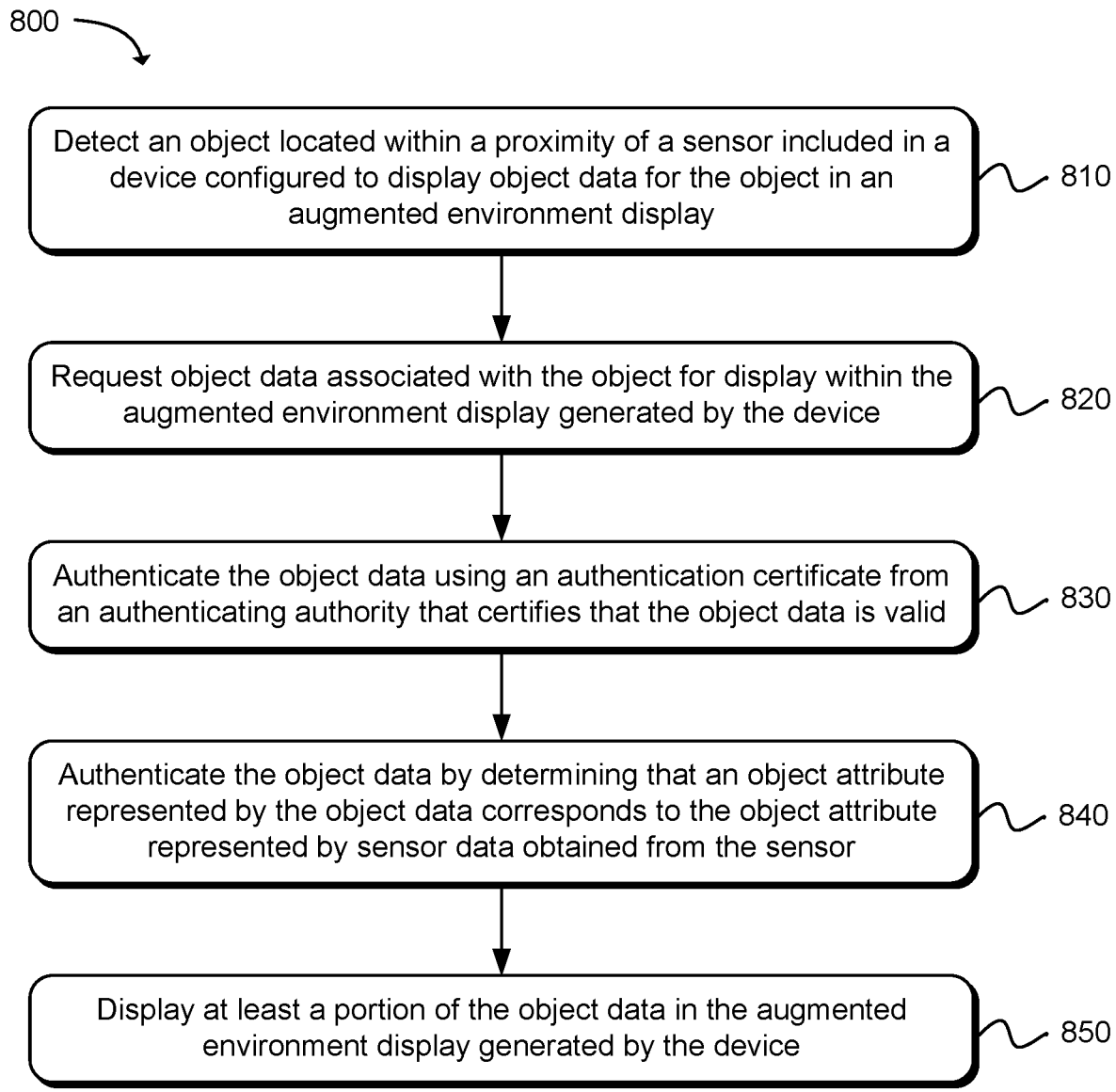
FIG. 8 is a flow diagram illustrating an example method for evaluating object data associated with an object represented in an augmented environment.

FIG. 8 is a flow diagram that illustrates an example method 800 for evaluating object data associated with an object represented in an augmented environment. As in block 810, an object located within proximity of a sensor included in a device may be detected. The device may be configured with a plurality of sensors that may be capable of detecting the presence of an object and collecting sensor data associated with the object. The device may also be configured to display object data for the object in an augmented environment display.

After detecting the object, as in block 820, object data associated with the object may be requested for display within the augmented environment display generated by the device. In one example, the object may provide the object data to the device. In another example, the object data may be obtained from a data service provider identified by the object.

After the object data has been obtained, the object data may be authenticated. A combination of authentication methods may be used. As in block 830, the object data may be authenticated using an authenticating authority that certifies that the object data is valid. For example, a digital certificate issued by a certificate authority may be provided to the device and the digital certificate may be authenticated using a certificate authentication technique.

As in block 840, the object data may then be authenticated by determining that an object attribute represented by the object data corresponds to the object attribute represented by sensor data obtained from the sensor. After the object data has been authenticated, as in block 850, at least a portion of the object data may be displayed in the augmented environment display generated by the device.

Figure 9:
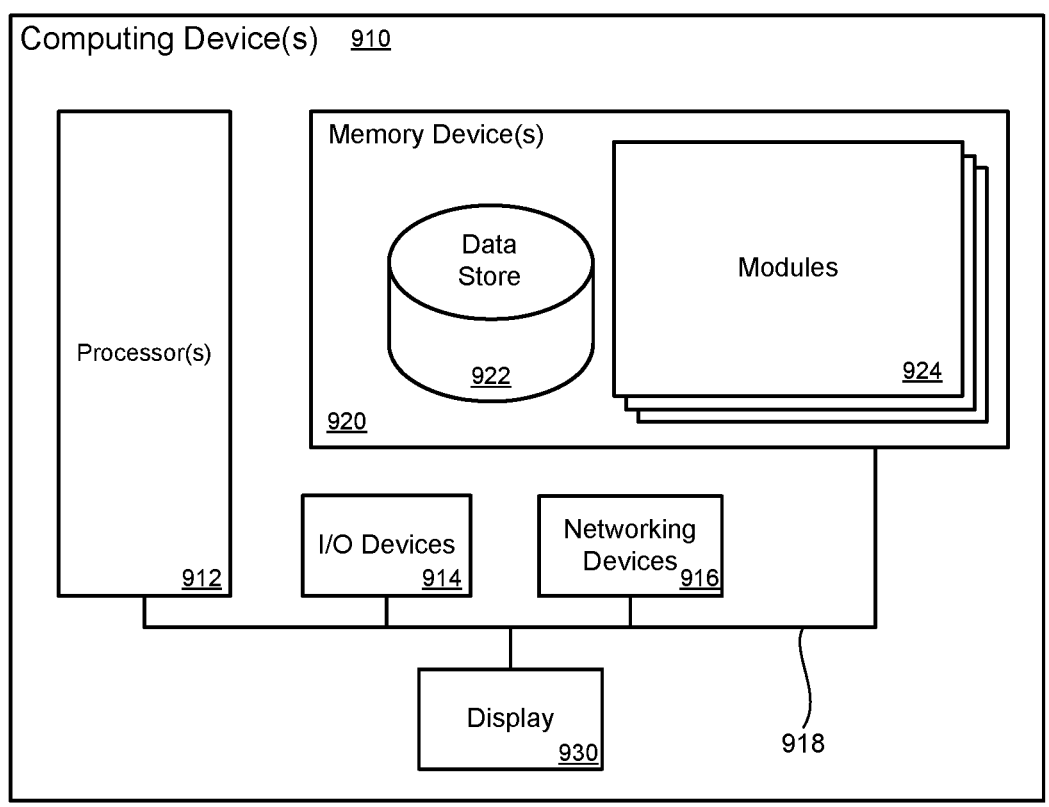
FIG. 9 is block diagram illustrating an example of a computing device that may be used to execute a method for authentication of object data for inclusion in an augmented environment display generated by an AR device.

FIG. 9 illustrates a computing device 910 on which modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 924 that are executable by the processor(s) 912 and data for the modules 924. For example, the memory device 920 may include an object detection module, data request module, data authentication module, data filtering module, and other modules. The modules 924 may execute the functions described earlier. A data store 922 may also be located in the memory device 920 for storing data related to the modules 924 and other applications along with an operating system that is executable by the processor(s) 912.

Other applications may also be stored in the memory device 920 and may be executable by the processor(s) 912. Components or modules discussed in this description that may be implemented in the form of software using high programming level languages that are compiled, interpreted or executed using a hybrid of the methods.

The computing device may also have access to I/O (input/output) devices 914 that are usable by the computing devices. An example of an I/O device is a display screen 930 that is available to display output (an augmented environment) from the computing devices. Networking devices 916 and similar communication devices may be included in the computing device. The networking devices 916 may be wired or wireless networking devices that connect to the internet, a LAN, WAN, or other computing network.

The components or modules that are shown as being stored in the memory device 920 may be executed by the processor(s) 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory device 920 may represent multiple memory units that operate in parallel to the processing circuits. This may provide parallel processing channels for the processes and data in the system. The local interface 918 may be used as a network to facilitate communication between any of the multiple processors and multiple memories. The local interface 918 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, non-transitory media such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for evaluating object data associated with an object represented in an augmented environment comprising:
   at least one processor;
   a memory device including instructions that, when executed by the at least one processor, cause the system to:
   detect the object located within a proximity of a sensor included in a device configured to generate the augmented environment, wherein the device includes a plurality of sensors;
   send a message to the object using a wireless communication protocol requesting the object data for display within the augmented environment, wherein the object is configured to provide the object data with an object attribute of the object, and a digital certificate in response to receiving the message;
   authenticate the object data received from the object using certificate authentication to authenticate the digital certificate received with the object data;
   authenticate the object data by comparing the object attribute of the object with sensor data associated with the object obtained from the plurality of sensors included in the device to determine whether the object attribute of the object represented by the object data corresponds to the object attribute represented by the sensor data;
   assign a validation score to the object data based in part on the authentication of the object data;
   determine whether the validation score assigned to the object data satisfies a validation score threshold for displaying the object data in the augmented environment generated by the device; and
   display at least a portion of the object data in the augmented environment of the device as a result of the validation score satisfying the validation score threshold.

2. A system as in claim 1, wherein the memory device includes instructions that, when executed by the processor, cause the system to further authenticate the object data using social authentication that obtains a reputation associated with the object data as determined by a social group.

3. A system as in claim 1, wherein the memory device includes instructions that, when executed by the processor, cause the system to send the object a second message indicating a failure to authenticate the object data and a refusal to accept the object data.

4. A system as in claim 1, wherein the memory device includes instructions that, when executed by the processor, cause the system to further:
   detect that the object is no longer in the proximity of the sensor included in the device; and
   remove the object data from the augmented environment generated by the device.

5. A computer implemented method, comprising:
   detecting an object located within a proximity of a sensor of a device, the device being configured to display object data associated with the object in an augmented environment display;
   requesting the object data with an object attribute of the object for display within the augmented environment display;
   authenticating the object data using an authentication certificate from an authenticating authority that certifies that the object data is valid;
   authenticating the object data by comparing the object attribute of the object with sensor data associated with the object obtained from the sensor to determine whether the object attribute of the object corresponds to the object attribute represented by the sensor data; and
   displaying at least a portion of the object data in the augmented environment display of the device.

6. A method as in claim 5, further comprising analyzing the sensor data received from the sensor to identify the object attribute represented by the sensor data.

7. A method as in claim 5, further comprising receiving instructions from the object to obtain the object data for the object from a data service provider.

8. A method as in claim 5, further comprising receiving a digital certificate that is signed by the authenticating authority, and wherein the digital certificate includes a reference that is used to obtain the object data from a data service provider.

9. A method as in claim 8, wherein the digital certificate includes an embedded token that provides access to the object data for a specified time period.

10. A method as in claim 5, further comprising:
obtaining an object data stream associated with the object from the object itself or from an object data stream service; and
displaying at least a portion of the object data stream in the augmented environment display generated by the device.

11. A method as in claim 5, further comprising determining to display at least a portion of the object data in the augmented environment display based in part on an object filtering parameter that specifies a type of object to display in the augmented environment display.

12. A method as in claim 5, further comprising determining to display at least a portion of the object data in the augmented environment display based in part on a data filtering parameter that specifies a type of object data to display in the augmented environment display.

13. A method as in claim 5, further comprising determining to display at least a portion of the object data in the augmented environment display based in part on a reputation of the object data provided by a community of object data reviewers.

14. A method as in claim 5, further comprising providing a review indicating a reputation of the object data for inclusion in a public review data store available to a community of object data reviewers.

15. A method as in claim 5, wherein the object within the proximity of the sensor included in the device is configured with a communication module that is capable of communicating with the device.

16. A method as in claim 5, further comprising displaying a virtual object in the augmented environment display when the sensor included in the device is in proximity of the object associated with the virtual object.

17. A non-transitory machine readable storage medium having instructions embodied thereon, wherein the instructions when executed by a processor:
detect an object via a sensor included in a device having a plurality of sensors, wherein the device is configured to provide an augmented environment display that displays the object and object data;
request authentication data from the object that includes metadata for the object, wherein the object is configured to provide the authentication data in response to receiving the request;
authenticate the authentication data using an authentication certificate from an authenticating authority that certifies that the authentication data is valid;
analyze sensor data associated with the object generated by the plurality of sensors to identify object attributes represented in the sensor data;
compare the object attributes represented by the sensor data with the object attributes represented by the metadata for the object;
determine that the object attributes represented by the sensor data correspond to the object attributes represented by the metadata for the object;
request the object data from the object for display in the augmented environment display generated by the device; and
display at least a portion of the object data in the augmented environment display generated by the device.

18. A non-transitory machine readable storage medium as in claim 17, wherein the authentication data further comprises a digital certificate that includes the metadata for the object.

19. A non-transitory machine readable storage medium as in claim 17, wherein the instructions when executed by the processor further:
query a trusted social group for reputation data associated with an object identifier included in the authentication data that is associated with the object; and
determine that the reputation data satisfies a reputation data threshold for displaying the object data in the augmented environment display generated by the device.

20. A non-transitory machine readable storage medium as in claim 17, wherein the instructions when executed by the processor further:
analyze the metadata for the object to identify an object type associated with the object; and
determine that the object type is included in a group of object types associated with object data that is approved for display in the augmented environment display generated by the device.

* * * * *